(12) United States Patent
Smith

(10) Patent No.: US 8,027,930 B2
(45) Date of Patent: Sep. 27, 2011

(54) METHOD AND APPARATUS FOR UPDATING CERTIFICATE INFORMATION BETWEEN BUYERS AND SUPPLIERS

(75) Inventor: Matthew J. Smith, Auckland (NZ)

(73) Assignee: Icix Pty., Ltd. (AU)

(*) Notice: Subject to any disclaimer, the term of this patent is extended or adjusted under 35 U.S.C. 154(b) by 108 days.

(21) Appl. No.: 12/393,016

(22) Filed: Feb. 25, 2009

(65) Prior Publication Data

US 2009/0240541 A1 Sep. 24, 2009

Related U.S. Application Data

(63) Continuation-in-part of application No. 10/899,656, filed on Jul. 26, 2004.

(51) Int. Cl.
G06Q 40/00 (2006.01)
G06Q 99/00 (2006.01)

(52) U.S. Cl. .......................................... 705/317; 705/4

(58) Field of Classification Search .................. None
See application file for complete search history.

(56) References Cited

U.S. PATENT DOCUMENTS

| 5,765,138 | A | 6/1998 | Aycock et al. | |
|---|---|---|---|---|
| 6,014,644 | A | 1/2000 | Erickson | |
| 7,353,497 | B2 | 4/2008 | Maresca et al. | |
| 7,398,220 | B1* | 7/2008 | Hayes | 705/4 |
| 2002/0022976 | A1* | 2/2002 | Hartigan | 705/4 |
| 2002/0184524 | A1 | 12/2002 | Steele et al. | |
| 2003/0212604 | A1 | 11/2003 | Cullen, III | |
| 2005/0071246 | A1 | 3/2005 | Smith et al. | |
| 2005/0144046 | A1* | 6/2005 | Schloss | 705/4 |

* cited by examiner

*Primary Examiner* — Faris Almatrahi

(74) *Attorney, Agent, or Firm* — Mahamedi Paradice Kreisman LLP; William L. Paradice, III; Christopher J. Brokaw

(57) ABSTRACT

A computer system that manages compliance information between a buyer and a number of suppliers includes a database and is operable to store supplier guidelines corresponding to a product the buyer desires to purchase, store a list of approved suppliers, provide the suppliers with access to the supplier guidelines, store compliance information indicating whether one or more of the suppliers is in compliance with the supplier guidelines, and selectively update the list of approved suppliers in response to the compliance information. The computer system is also operable to store supplier certificates and to request updated supplier certificates provided directly from a certification issuer.

7 Claims, 9 Drawing Sheets

METHOD AND APPARATUS FOR UPDATING CERTIFICATE INFORMATION BETWEEN BUYERS AND SUPPLIERS

CROSS-REFERENCE TO RELATED APPLICATION

The present application is a continuation-in-part and claims the benefit under 35 USC §120 of commonly-owned and co-pending U.S. patent application Ser. No. 10/899,656 filed Jul. 26, 2004.

FIELD OF INVENTION

The present invention relates in general to computer systems for exchanging information and, more specifically, to a computer system for sharing compliance information between buyers and suppliers regarding products the buyers desire to obtain.

DESCRIPTION OF RELATED ART

Computer systems including those connected together by the Internet are widely used to coordinate business transactions and the flow of goods and services between buyers and suppliers. However, most businesses currently manage their suppliers for compliance with supplier guidelines, government certificates, and industry standards using a paper-based system, which typically requires significant storage overhead and management personnel. In addition, paper-based compliance systems require buyers to periodically print and mail the same documents such as supplier guidelines to many different suppliers, which can be costly and time consuming. Similarly, such paper-based systems also require suppliers to print and mail certificates such as food safety inspection reports to many different buyers, which is also costly and time consuming. Further, in many industries such as the food service industry, many documents such as supplier guidelines are frequently updated, which requires updated documents to be mailed out to all the suppliers, during which time many suppliers may not be aware of the buyer's policy changes. Further, incorrect or outdated addresses for the suppliers often exacerbates the problem of keeping suppliers updated with policy changes.

Thus, there is a need for a centralized and automated mechanism to quickly exchange information between buyers and suppliers relating to product guidelines, supplier certificates and compliance information, and recall notices. There is a further need to provide an information exchange network in which a buyer requesting a certificate from a supplier can receive the certificate directly from the certification entity (e.g., rather than from the supplier), thereby reducing delivery time of the certificate to the requesting buyer and ensuring the authenticity of the certificate.

BRIEF DESCRIPTION OF THE DRAWINGS

Like reference numerals refer to corresponding parts throughout the drawing figures.

DETAILED DESCRIPTION

Figure 1:
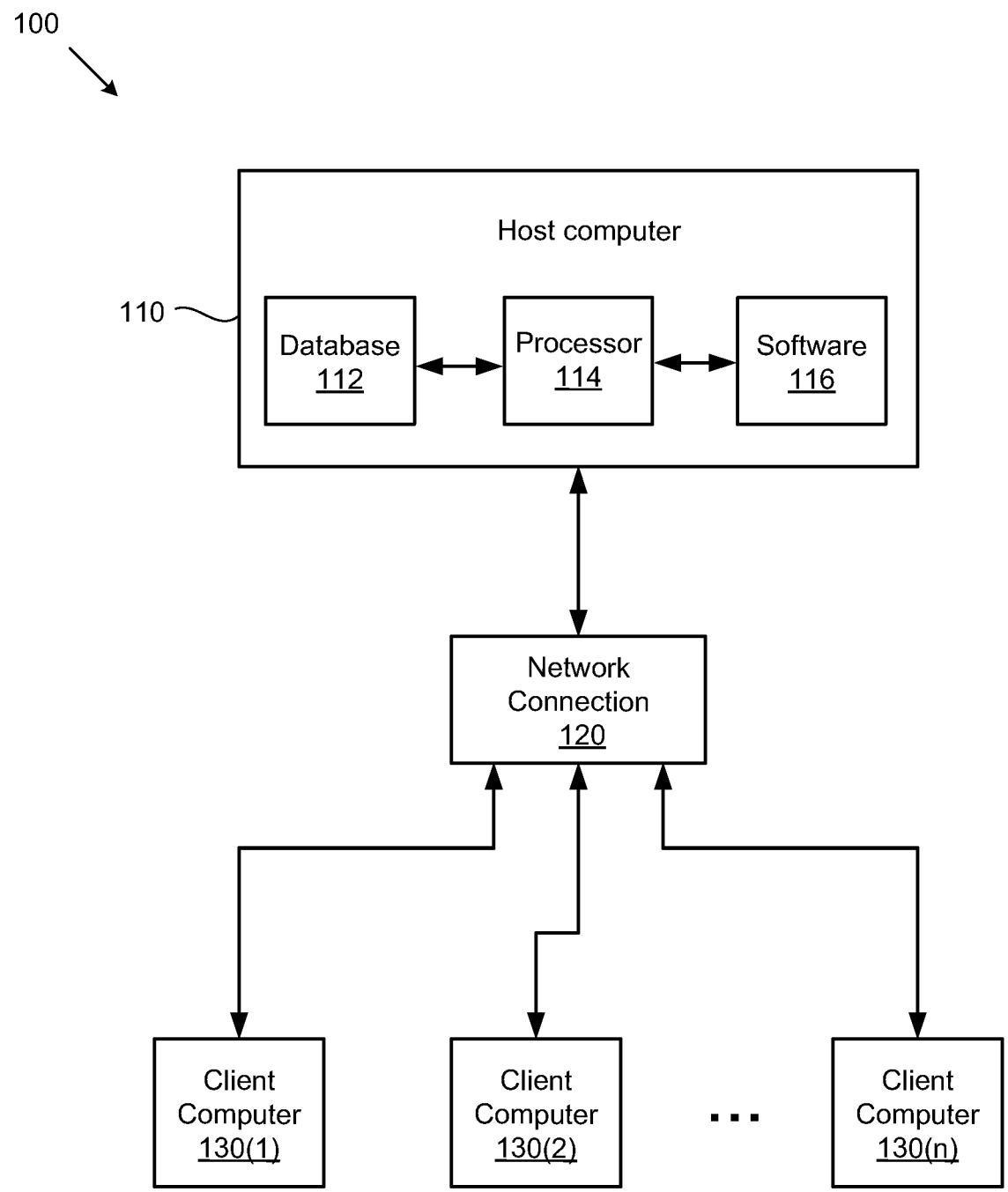
FIG. 1 is a block diagram of one embodiment of a computer system in accordance with one of the present embodiments.

A method and apparatus for sharing compliance information between buyers and suppliers is disclosed. In the following description, for purposes of explanation, specific nomenclature is set forth to provide a thorough understanding of the present invention. For example, as used herein, the term "compliance information" generally refers to information regarding the requirements that a buyer desires or expects to be met with respect to a product the buyer plans to obtain from a supplier. These requirements may include various guidelines associated with the product and/or its delivery from the supplier to the buyer, various certifications required of the supplier, and/or other information that may be exchanged between the buyer and supplier to facilitate operation of present embodiments. Further, as used herein, the term "product" includes both goods and services the buyer wishes to obtain from the supplier. In addition, as used herein, the term "user" generally refers to a buyer of products, a supplier of products, persons authorized by either buyers or suppliers (e.g., supplier and/or buyers affiliates), and persons authorized to manage the computer system (e.g., system administrators). However, it will be apparent to one skilled in the art that these specific details may not be required to practice the present invention. In other instances, well-known circuits and devices are shown in block diagram form to avoid obscuring the present invention unnecessarily. Additionally, the sequence of operations performed by exemplary embodiments described herein are illustrative, and may be altered as desired. Accordingly, the present invention is not to be construed as limited to specific examples described herein but rather includes within its scope all embodiments defined by the appended claims.

In accordance with the present invention, a computer system is disclosed that facilitates the electronic exchange of information between buyers and suppliers of products, for example, via the Internet. The computer system may include a database allowing exchange of certification, product, and compliance records among various users of the computer system. The computer system may also allow buyers to request and track corrective action taken by suppliers that have provided non-conforming products to a buyer and/or corrective action taken by suppliers in response to invalid (e.g., expired) certifications. In addition, the computer system allows buyers to create and update an approved list of suppliers that meet supplier guidelines and/or that have valid certifications.

The computer system according to the present invention may be useful in a wide variety of industries and applications. In general, any buyer that is required to manage information regarding compliance requirements of suppliers with which the buyer interacts may advantageously use the computer system as described herein. For example, the buyer may be a purchaser of food products, pharmaceuticals, oil and gas, or other products; general contractors requiring services to be provided from numerous subcontractors; or other entities engaged in commerce of numerous types. Thus, while buyers previously maintained individual paper records regarding certification, product, and compliance information for each of its suppliers, the computer system according to the present invention facilitates the electronic exchange of information between buyers and suppliers, which allows suppliers to standardize the manner of delivery and/or the types of information provided to a buyer, allows buyers to standardize the manner of delivery and/or the types of information provided to a supplier, and allows such information to be instantly updated and exchanged via a centralized database. In this manner, embodiments of the present invention may significantly reduce storage, delivery, and management costs associated with exchanging compliance information between buyers and suppliers, and may also significantly reduce the time required to exchange and update such information. In addition, these arduous, time consuming, and risk-prone duties of a buyer associated with receiving and/or reporting information to his network of suppliers can be delegated to the compliance exchange system described herein, thereby allowing the buyer to focus on his core business, rather than expend valuable resources tracking the certification (e.g., and other status information) of all of his associated suppliers.

For example, in the food service industry, embodiments of the present invention allow buyers such as a grocery store chain to store and update standardized supplier guidelines and product information in a centralized database of the computer system. The centralized database can be remotely accessed by the store chain and/or by one or more of the chain's suppliers, thereby eliminating the need to print and mail documents such as the aforementioned supplier guidelines to each of the chain's suppliers. The supplier guidelines and product information may be updated electronically by the store chain, for example, by uploading new documentation to the computer system. In response thereto, the computer system can be configured to send an alert (e.g., via telephone, MMS text messaging, and/or email) to the chain's suppliers indicating that an update to the supplier guidelines and/or product information has been posted on the centralized database. In response to the alert(s), the suppliers may have immediate access to any changes in the documentation by accessing the centralized database. Similarly, the computer system of the present invention allows suppliers to store certificates such as food safety inspection reports issued by the USDA in the centralized database so that the supplier's buyers may instantly access such information, thereby saving time and costs associated with copying and mailing the certificate to each of the supplier's buyers.

The computer system of the present invention also allows buyers to create and manage a list of approved suppliers from which a buyer may search for and compare various suppliers based on a variety of criteria stored by the computer system.

Access to the computer system and its database may be provided in any suitable manner. For some embodiments, access to the computer system and its database may be provided using a conventional website accessible via the Internet by one or more client computers, for example, running a web browser. For other embodiments, access to the computer system and its database may be provided by a local input device connected directly to the computer system such as, for example, using a keyboard and/or mouse. For some embodiments, each user of the computer system may be issued a username and password for accessing the computer system's database. For one embodiment, a user may be issued a plurality of usernames and associated passwords, where each username allows access to a different number of resources stored in the database.

For example, when a user initially registers to access the computer system, the user may create a company profile document containing detailed information about the user's business. Each new user also may receive an individual site within the computer system's website that other users can access to view the documents provided by the user. Users may create documents that are posted on the user's individual site according to various categories such as certifications, product descriptions, and compliance documents. Users may limit access to all or a portion of the documents posted by the user, or the user may allow all other members of the computer system to access the documents.

The computer system may operate as an approved supplier management system and database by enabling a buyer to more readily search for possible suppliers and to verify that the suppliers comply with the buyer's guidelines (e.g., purchasing standards). This verification may be accomplished, for example, using various documents uploaded to and stored within the database by suppliers to demonstrate compliance with supplier guidelines, industry regulations, and/or government inspections and audits. These verification documents may be in addition to other documents provided by suppliers detailing the products offered by each supplier and the certifications received by each supplier. After locating acceptable suppliers, buyers may create a confidential list of approved suppliers, which may be sorted based on the certification, product, and compliance records corresponding to the suppliers. The approved supplier list, which may provide links to the individual user sites for selected suppliers, may be subsequently updated by the buyer in response to supplier non-compliance. Users may create reports based on their supplier list by sorting the list by supplier name, certifications, or products offered.

The computer system may also allow buyer to request corrective action from a supplier that has delivered a defective or otherwise non-compliant product to the buyer and/or to request corrective action from a supplier that has an invalid (e.g., expired) certificate. The supplier may respond to the corrective action request electronically, for example, by uploading a document explaining the supplier's non-compliance and outlining corrective actions the supplier intends to take. The corrective action requests, as well as the supplier responses, may be stored in the computer system for subsequent analysis by the buyer to identify non-compliance patterns or trends, and the approved supplier list may be updated accordingly.

For one example, a buyer that receives a damaged product from a supplier may create, post, and electronically transmit a corrective action request to the supplier requesting an explanation of why the product is damaged and/or what corrective actions the supplier is taking. For another example, a buyer may periodically check a supplier's certificates posted on the computer system to ensure that the certificate is valid and, if the certificate is not valid or is about to expire, the buyer may send a corrective action request to the supplier requesting the supplier to update his certificate. In response thereto, the supplier may post a newly issued certificate on the computer system for subsequent access by the buyer.

FIG. 1 is a block diagram generally representative of a computer system 100 that may be used to implement various embodiments of the present invention. Computer system 100 includes a host computer 110, a network connection 120, and a plurality of client computers 130(1)-130(n). Host computer 110, which may be any well-known computer system including, for example, a personal computer, a server, a mainframe computer, and the like, includes a database 112, a processor 114, and computer software 116. For some embodiments, host computer system 110 employs a well-known server such as Microsoft's SQL server, although other computer systems may be used. Processor 114, which may be any well-known processor, executes software 116 and is in communication with database 112. Database 112 and software 116 may be stored in any suitable memory element such as, for example, non-volatile memory, a magnetic disk, an optical disk, a tape medium, and the like. Software 116 is operable to provide and execute the computer system functionality as illustrated and described herein, and may be implemented using conventional programming languages and tools. Database 112 operates in conjunction with software 116 and may store compliance information, product information, approved supplier lists, supplier certificates, corrective action request lists, and other information as described herein. Database 112 may also store business rules data used by host computer 110, for example, in ranking suppliers by their level of compliance with compliance information stored in database 112. These rankings may be presented as an ordered list to a user of computer system 100.

Computer system 100 is shown in FIG. 1 as connected to a plurality of client computers 130(1)-130(n) via a network connection 120. Client computers 130, which may be any well-known computer, provide users with access to host computer 110. Network connection 120 may be any suitable connection including, for example, a local area network (LAN), a wide area network (WAN), the Internet, and the like. For other embodiments, one or more client computers 130 may be connected directly to host computer 110, e.g., with requiring network connection 120. Client computers 130 may store files that a user attaches to certain document records (e.g., a corrective action request) presented to the user by computer system 100. For other embodiments, users may access computer system 110 using a local input device such as a keyboard and/or mouse (not shown for simplicity).

Figure 2:
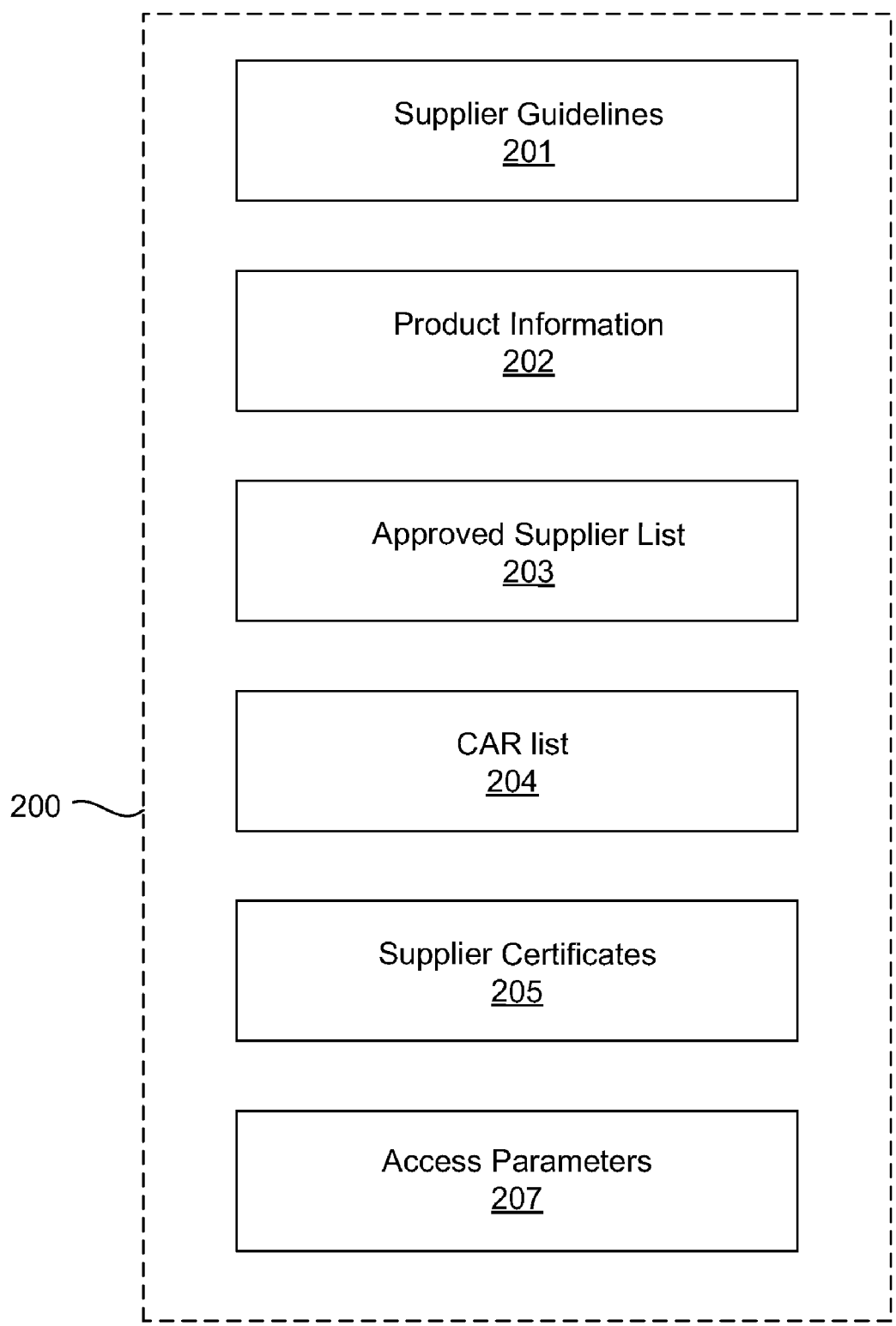
FIG. 2 is a block diagram illustrating a database configured in accordance with one of the present embodiments.

FIG. 2 is a block diagram illustrating a database 200 that is one embodiment of database 112 of host computer system 110. Database 200 is shown to include supplier guidelines 201, product information 202, an approved supplier list 203, a corrective action request (CAR) list 204, supplier certificates 205, and access parameters 206. Supplier guidelines 201, which may include various information such as operating procedures and mandates a supplier is expected to adhere to, may be uploaded to and stored within database 200 electronically by a buyer having access to computer system 201. For example, a buyer may store supplier guidelines in database 200 using a suitable electronic format such as an Adobe PDF file so that suppliers having access to computer system 200 may view the supplier guidelines. In this manner, a buyer may post supplier guidelines one time to computer system 110 for immediate viewing by a large number of suppliers without having to mail each supplier a paper copy of the supplier guidelines, and may instantaneously modify the guidelines by uploading an updated version of the guidelines, thereby allowing suppliers to immediately view any changes in the guidelines.

Product information 202, which may describe the products a buyer wishes to obtain and/or products a supplier wishes to sell, are stored as electronic documents (e.g., as Adobe PDF files) in database 200, thereby allowing buyers to easily search for suppliers that sell a particular product and to obtain information regarding that product and, similarly, allowing suppliers to easily search for buyers that wish to purchase a particular product and to obtain information regarding that product. In this manner, by storing product information on computer system 110, both buyers and suppliers may post a product description one time for subsequent access by any number of users, thereby eliminating printing, mailing, and storage costs previously associated with a paper-based system. Further, as with the supplier guidelines, the product information may be instantly updated by simply uploading a revised product information document to the computer system 110.

Approved supplier list 203 may be a list of suppliers that are currently in compliance with supplier guidelines and/or various insurance and inspection requirements of the buyer or governmental agency. Storing the approved supplier list 203 in database 200 allow buyers to easily search for approved suppliers, and also allows buyers to easily update the list when an existing supplier becomes non-compliant or when a new supplier is approved. As mentioned above, maintaining an approved supplier list in a centralized database such as database 200 allow buyers to more easily manage and keep track of large numbers of suppliers, and ensures that various persons employed by the buyer yet located in different geographical regions may have simultaneous access to the same approved supplier list, which is difficult to implement using conventional paper-based systems.

Corrective action request list 204 includes a list of corrective action requests created by a buyer and sent to one or more suppliers, and may also include the supplier responses to these corrective action requests. As explained in more detail below, maintaining a corrective action request list in database 200 not only allows a buyer to easily track corrective action requests sent to suppliers and to monitor supplier responses but also allows the buyer to identify non-compliance patterns or trends for various suppliers, for various products, for various geographical regions, and the like.

Supplier certificates 205 may include certificates required by the buyers and/or by a governmental or industry agency. For example, in the food industry, suppliers are typically subject to inspection by the USDA for food safety violations, and if the supplier does not violate the food safety guidelines, the USDA issues the supplier a certificate, which must be periodically validated. For another example, a supplier claiming to grow organic crops is typically required to pass certain requirements relating to organic food growing, and is usually issued a certificate indicating USDA approval as an organic grower. For other embodiments, the certificates can be an audit, for example, performed by a governmental agency and/or by an industry-sanctioned entity. Each supplier may post their certificates in electronic form (e.g., as an Adobe PDF file) to computer system 110 for subsequent viewing by any number of buyers, thereby eliminating the need for the supplier to mail duplicate copies of the certificate to each buyer that the supplier wishes to do business with. In addition, as mentioned above, the ability to store supplier certificates in a centralized database such as database 200 allows buyers to easily manage and track the validity of certificates for a large number of suppliers.

Access parameters 206 indicate which users of computer system 110 may access and view certain documents. For example, a supplier may select which buyers may access its certificates and/or product information, and a buyer may select which suppliers may access its supplier guidelines and product information. In addition, access parameters 206 may also indicate which usernames of a particular user may access certain documents, and which usernames of the user are restricted from accessing other documents. The access parameters 206 are stored in electronic format in database 200.

Figure 3:
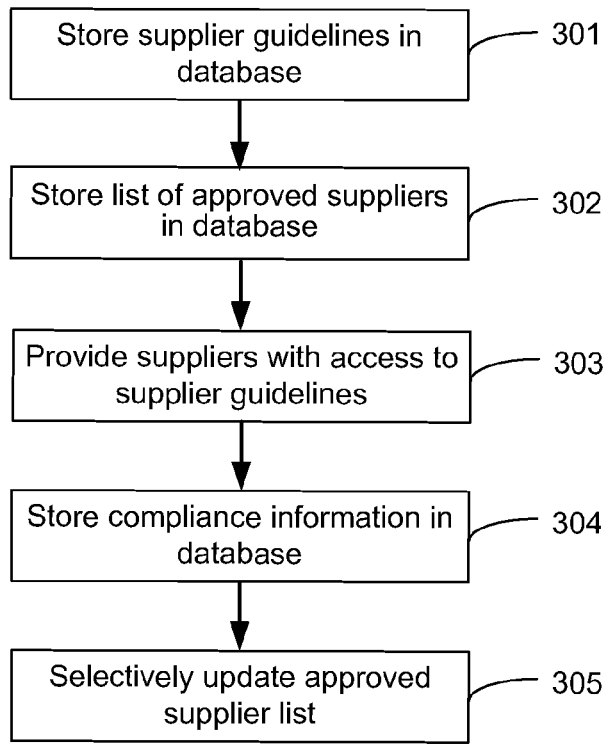
FIG. 3 is an illustrative flow chart depicting an exemplary operation for updating an approved supplier list in accordance with one of the present embodiments.

An exemplary operation of updating the approved supplier list in database 200 is described below with respect to the illustrative flow chart of FIG. 3. First, a buyer creates supplier guidelines and stores the guidelines in the database 200 in a well-known manner, for example, by uploading the supplier guidelines as an Adobe PDF file or other suitable document to database 200 using one of client computers 130 (301). The supplier guidelines, which may include information outlining various buyer policies and/or expectations of the supplier, can be easily modified by uploading a new supplier guideline document. Then, the buyer creates a list of approved suppliers and stores the approved supplier list in database 200, for example, by uploading the list to database 200 using client computer 130 (302). Once the approved supplier list is created, the buyer may search the list by product, supplier business, or various certification parameters. Further, the buyer user may search for approved suppliers in database 200, and then link suppliers to form a confidential approved supplier list.

The supplier guidelines stored in database 200 are then accessible by suppliers who may view and/or download the guidelines from database 200 (303). For some embodiments, the computer system may broadcast the supplier guidelines via the Internet or email them to one or more suppliers. For other embodiments, the computer system may electronically notify (e.g., via email) one or more suppliers that modifications have been made to the supplier guidelines. Once the supplier guidelines are posted to the computer system and accessible by suppliers via the computer system's interface (e.g., the computer system's website), the suppliers are expected to adhere to the policies outlined in the guidelines. For some embodiments, suppliers doing business with the buyer are expected to periodically check database 200 for updates to the supplier guidelines.

The buyer may then store compliance information in the database indicating whether one or more suppliers are in compliance with the supplier guidelines (304). For some embodiments, the compliance information may indicate whether approved suppliers have delivered non-compliant (e.g., defective or damaged) products to the buyer and/or may indicate whether approved suppliers are currently certified (e.g., having valid insurance certifications, USDA food safety certifications, organic certificates, and the like). Then, in response to the compliance information, the buyer may selectively update the approved suppliers list (305). For example, if a supplier has repeatedly delivered damaged products and/or has not remedied previous non-compliance issues, the buyer may delete the supplier from the approved supplier list. In this manner, any number of persons within the buyer's organization has immediate access to the approval status of each supplier via computer system 110, thereby reducing errors associated with informing a large number of people about a supplier's approval status. For some embodiments, computer system 110 may be configured to send an electronic notice (e.g., via email) informing the supplier that it is no longer approved.

Figure 4:
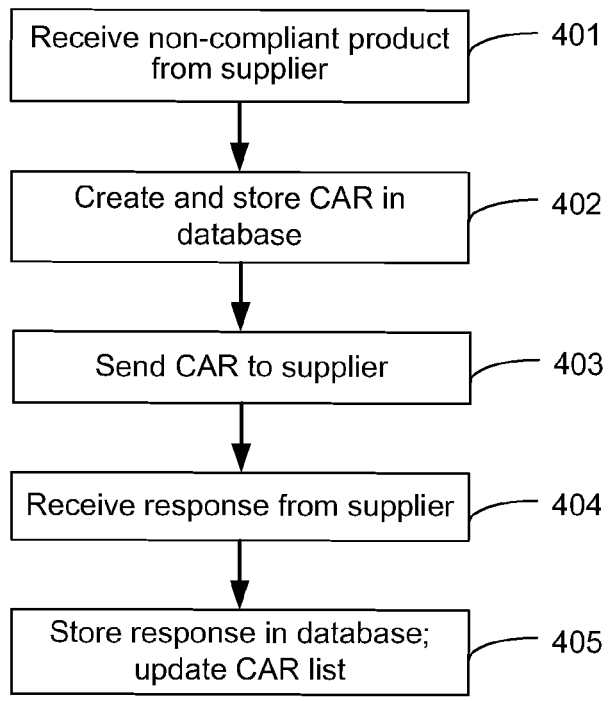
FIG. 4 is an illustrative flow chart depicting an exemplary operation for issuing a corrective action request in accordance with one of the present embodiments.

An exemplary operation of issuing a corrective action request in response to receiving a non-compliant product from a supplier is described below with respect to the illustrative flow chart of FIG. 4. In response to the buyer receiving a non-compliant product such as rotten apples from a supplier (401), the buyer creates and uploads a corrective action request for storage in the computer system 110 (402). For some embodiments, the corrective action request may allow for inclusion of supporting documentation such as a digital picture of the non-compliant product. Then, the corrective action request is sent to the supplier (403). For some embodiments, the supplier may be notified of the corrective action request at the time of the supplier's next access to computer system 110. For other embodiments, the corrective action request may be transmitted electronically (e.g., via email) to the supplier. The supplier then responds to the corrective action request electronically by posting a response to the computer system website (404). The response may include an explanation of the non-compliant product and/or may indicate what corrective action the supplier intends to take (e.g., improve delivery methods to ensure subsequent products are delivered in a compliant manner). The response is then stored in the database, and the corrective action request list is updated with the corrective action request and its associated supplier response (405). For some embodiments, the buyer is notified of the supplier's response via an electronic notice such as email. If the buyer is satisfied with the supplier's response, the buyer may close out the corrective action request and archive the data from the corrective action request for future reference by the buyer using computer system 110. If the buyer remains unsatisfied, the buyer may reply to the supplier by resending the corrective action request to the supplier in a manner similar to that described above for the initial sending of the corrective action request, and thus may request that further action be taken by the supplier. This process may continue until either (1) the buyer is satisfied with the seller response or (2) the buyer removes the supplier from the approved supplier list.

In this manner, embodiments of the present invention allow buyers to monitor non-compliance issues with a large number of suppliers using a single database, and allow suppliers to immediately response to corrective action requests in the hopes of maintaining their status as an approved supplier. In addition, the ability to store corrective action requests and their supplier responses allow buyers to identify patterns in product non-compliance. For example, if apple deliveries from suppliers in Washington are consistently non-compliant during summer months, buyers may be able to identify possible causes of such non-compliant deliveries and/or to recognize repeated non-compliant deliveries from a particular supplier. The ability to access such information from a central database allows buyers to more easily identify sub-standard suppliers, and to update the approved supplier list accordingly.

Figure 5:
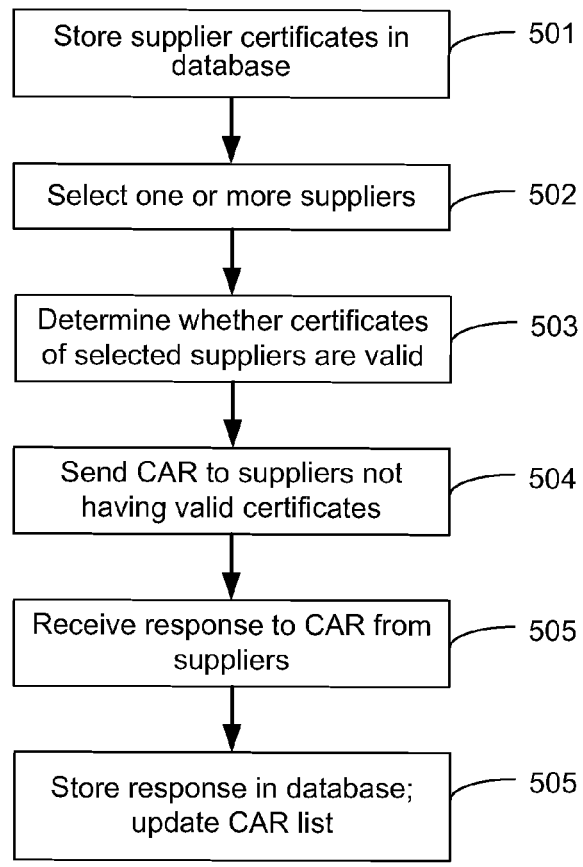
FIG. 5 is an illustrative flow chart depicting an exemplary operation for issuing a corrective action request in accordance with another of the present embodiments.

An exemplary operation of issuing a corrective action request in response to invalid supplier certificates is described below with respect to the illustrative flow chart of FIG. 5. First, the supplier uploads the certificate for storage in the database 200, for example, by posting the certificate in a suitable electronic format such as an Adobe PDF document to the computer system's web site (501). The buyer may select one or more suppliers to check for valid certificates (502). For some embodiments, the computer system 110 allows buyers to search for supplier certificates that have already expired.

For one embodiment, the computer system 110 also allows a buyer to search for supplier certificates that are to expire within a predetermined time period (e.g., within two months). The buyer then determines whether the certificates of the selected suppliers are invalid (or are about to become invalid) (503) and, in response thereto, may send to such suppliers a corrective action request indicating that their certificate is invalid or is about to expire (504). The buyers may then post a response to the corrective action request for storage in the computer system, and the corrective action request list may be updated accordingly (505). The response posted by the supplier, which for some embodiments is uploaded to the computer system's website as an Adobe PDF document, may include a new certificate, a document indicating why the certificate is valid, a document indicating an intention to obtain a new certificate, and the like. For some embodiments, the buyer is notified of the supplier's response via an electronic notice such as email.

Figure 6:
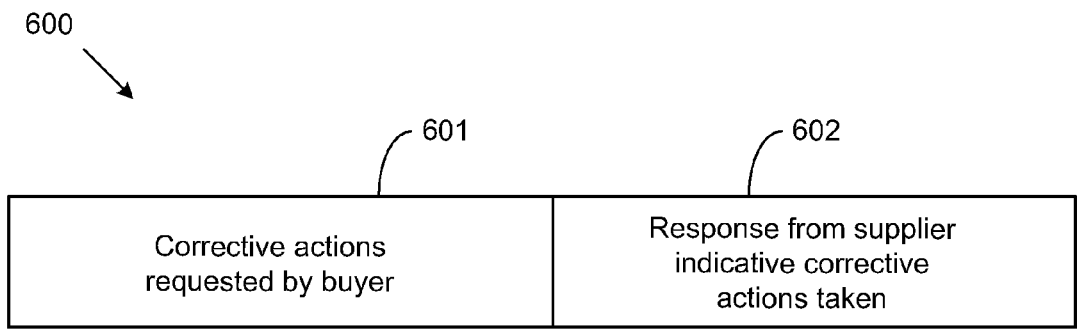
FIG. 6 is a block diagram illustrating a corrective action request in accordance with one of the present embodiments.

FIG. 6 shows an exemplary corrective action request that may be used in accordance with present embodiments. Corrective action request 600 is shown in FIG. 6 to include first and second field 601 and 602. First field 601 may contain the corrective actions requested by the buyer, for example, a request to renew a food safety inspection certificate. Second field 602 may include the supplier's response to the corrective action request, and for some embodiments may allow supporting documentation such as a new certificate to be attached to the corrective action request and sent back to the computer system for automatic storage therein. For other embodiments, the corrective action request may employ other formats.

As described above, multiple users may simultaneously access the computer system 110 via its website interface using client computers 130. The website interface is maintained by software 116 running on processor 114. To access computer system 110, a user may be required to register with a system administrator that creates a site for the user on computer system 110. The system administrator may be implemented using conventional system administration techniques. The site created by the buyer for a particular user will correspond to the level of access or permission granted to the user by the buyer. If the user is granted unlimited access, then the user's site will permit viewing substantially all of the data that the buyer user has loaded onto computer system 110. Users are able to upload data from client computers 130 to the document records that the user can access on the user's individual site on computer system 110. Users are able perform searches using database 200 and to view information retrieved from database 200 on the user's client computer 130.

In accordance with present embodiments, database 200 is operated and controlled by an entity that is independent of its users (e.g., buyers and suppliers that access database 200 via remote client computers 130). As a result, the integrity and accuracy of information such as supplier certificates 205 uploaded to database 200 can be verified and maintained in an unbiased manner. This is in contrast to product problem reporting systems that are operated by the same company that manufactures and/or sell the products, for example, such as the problem reporting system disclosed in U.S. Patent Publication No. 2002/0184524 to Steele et al.

As mentioned above, computer systems in accordance with the present embodiments can store compliance information for any good or service, and can store various types of certificates, licenses, reports, inspections, and evaluations relating to buyers and sellers within and/or across industries. More specifically, the certificates stored by computer system 110 can include product-related certificates, general business certificates, and other types of certificates. Product related certificates can include, for example, food safety inspections by a government authority, organic validation certificates granted by an organic foods consortium, kosher validation certificates granted by a kosher validating entity, and so on. Business related certificates can include, for example, insurance certificates, business licenses, financial audits, and so on.

Figure 7:
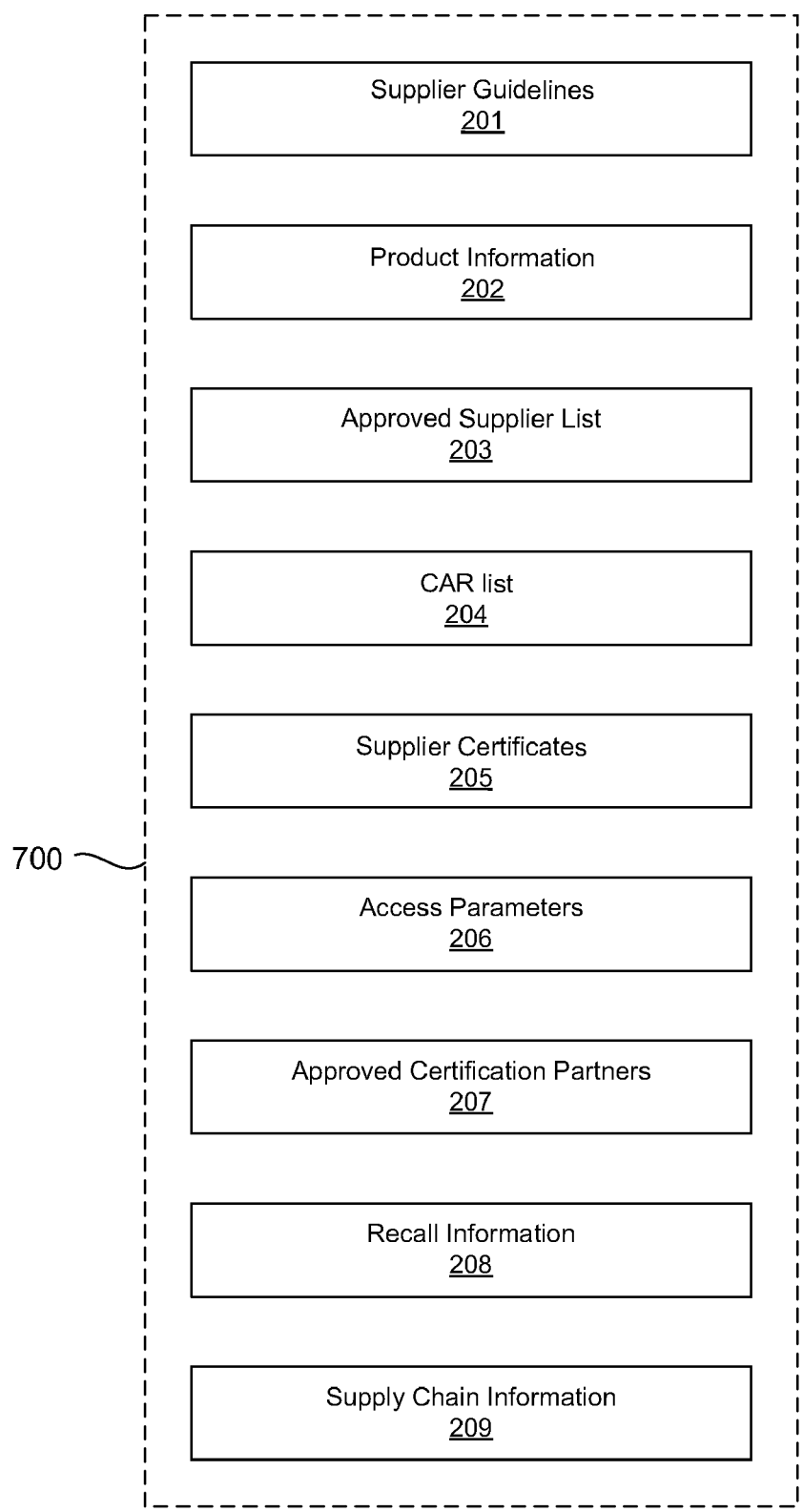
FIG. 7 is a block diagram illustrating a database configured in accordance with another of the present embodiments.

For some embodiments, computer system 110 can be configured to require supplier certificates to uploaded to the associated database by the entity responsible for issuing the certificate, rather than by the supplier receiving the certificate. For such embodiments, computer system 110 can employ a database 700 that also stores a list 208 of approved certification issuers for each type of certificate, as illustrated in FIG. 7. For example, database 700 can store a list of approved insurance companies, a list of approved organic certification authorities, a list of approved kosher certification authorities, a list of approved financial auditors, and so on. For some embodiments, each buyer registered with the information exchange network implemented by database 700 can provide the list of approved certification issuers, in which case the approved certification issuers can be selectively associated with each buyer. For other embodiments, certification issuers can become approved by joining the information exchange network embodied by computer system 110.

Figure 8A:
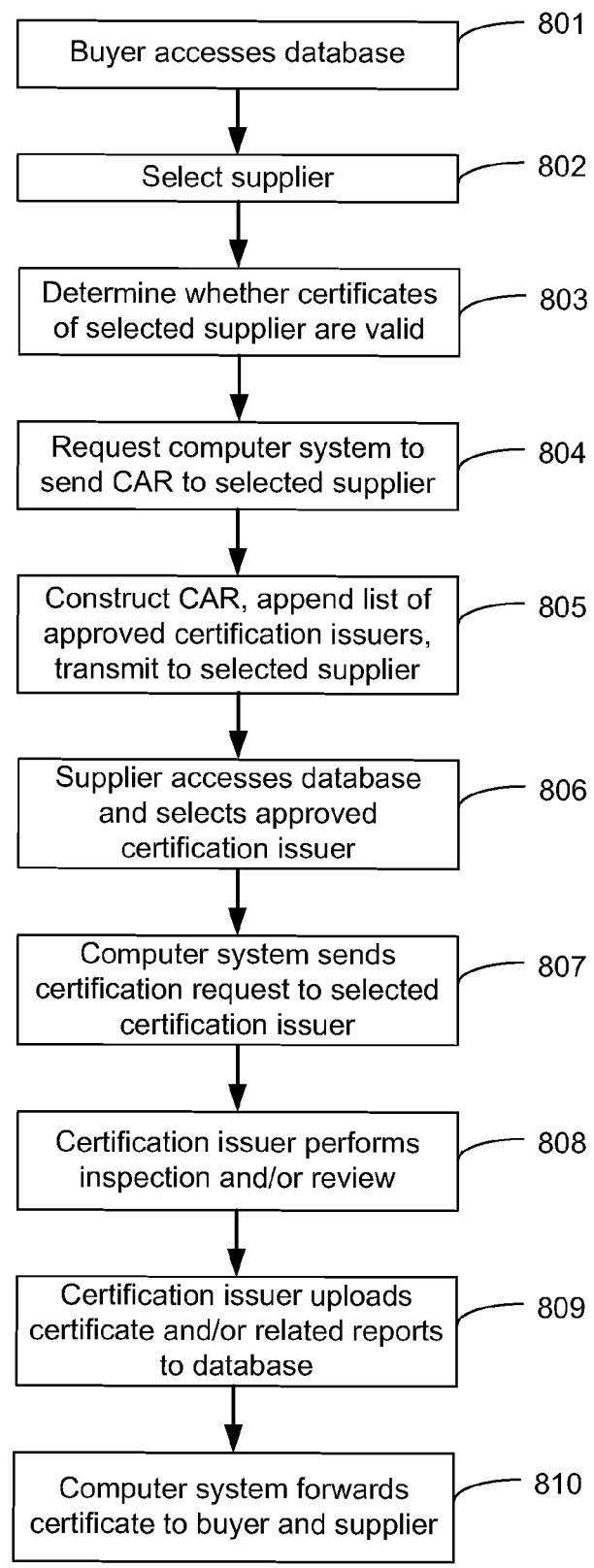
FIG. 8A is an illustrative flow chart depicting an exemplary operation between buyers and suppliers for updating a supplier certificate in accordance with another of the present embodiments.

An exemplary operation of updating supplier certificates in accordance with other embodiments is described below with respect to the illustrative flow chart of FIG. 8. First, the buyer access database 700 of computer system 110 via a remote computer 130 (801), and selects a supplier to check for valid certificates (802). For some embodiments, the computer system 110 allows buyers to search for supplier certificates that have already expired. For one embodiment, the computer system 110 also allows a buyer to search for supplier certificates that are to expire within a predetermined time period (e.g., within two months).

The buyer then determines whether the certificates of the selected supplier are invalid (or are about to become invalid) (803), and if so, requests the computer system 110 to send a corrective action request (CAR) to the selected supplier alerting the supplier that one or more of its certificates is invalid or is about to expire (804). In response thereto, the computer system 110 constructs a CAR indicating the certificates requested to be renewed or updated, appends a list of approved certification issuers associated with the buyer to the CAR, and transmits the CAR to the selected supplier (805). The CAR can be sent to the selected supplier by computer system 110 via email, text messaging, facsimile, and/or an automated phone message.

Upon receipt of the CAR, the supplier accesses the database 700 from a remote computer 130 and, for each of the requested certificates, selects one of the approved certification issuers to handle the certification (806). In response thereto, computer system 110 sends a certification request to the certification issuer(s) selected by the supplier (807). The certification request can be sent to the selected certification issuer by computer system 110 via email, text messaging, facsimile, and/or an automated phone message.

Upon receipt of the certification request, the selected certification issuer performs any necessary inspections and/or evaluations related to the certification request (808). The inspections can include on-site inspections such as food safety inspections and/or validated certifications (e.g., organic and kosher designations), and can include off-site evaluations such as insurance policies, business licenses, and financial audits.

After the inspection, the certification issuer uploads the requested certificate and/or associated reports directly to database 700 via an associated remote computer 130 (809). The associated reports can include executive summaries detailing the results of the inspection. For example, for a food safety inspection, the executive summary can include scores for a number of designated fields common to a health or food inspector's report. Thereafter, the computer system 110 forwards (e.g., via email) the requested certificate and any associated reports to the selected supplier and to the buyer that requested the certificates (810).

Because the certification issuer uploads the certificate(s) directly to database 700 for immediate access by the requesting buyer, the selected supplier cannot alter the certificate or delay its reporting to the buyer, thereby ensuring an efficient and reliable system for receiving supplier certificates requested by a buyer. In addition, by allowing the certification issuer to provide the supplier certificate directly to the buyer and supplier via the information exchange network of computer system 110, present embodiments reduce the supplier's administrative overhead associated with receiving certificates from the certification issuers, storing the certificates in a secure location, transmitting the certificates to the appropriate requesting buyers, and receiving receipts from the buyers. This is in contrast to prior systems in which the certification issuer provides the certificate to the supplier, which is then responsible for forwarding certificates to the appropriate buyers.

In addition, because database 700 stores of list of suppliers 203 for each buyer, computer system 110 can be used by a buyer to instantly send a CAR (e.g., for a new insurance policy) to all of its suppliers and then track the progress of each supplier in responding to the CAR. Further, once the certificates and executive summaries for all of a buyer's suppliers have been uploaded to and stored in database 700, computer system 110 can be instructed to generate a comparative analysis of the suppliers, for example, on food safety scores. More specifically, for some embodiments, the computer system 110 can be programmed to send an alert to a buyer if one or more selected scores on a food safety inspection for any of its suppliers fall below a predetermined threshold.

For some embodiments, computer system 110 can be instructed to send reminder notices to suppliers who have not responded to the CAR within a predetermined time period. For other embodiments, if the selected supplier prefers to use a certification issuer that is not listed as an approved certification issuer in database 110, the selected supplier can send a request to computer system 110 to add the certification issuer to the list of approved certification issuers.

Figure 8B:
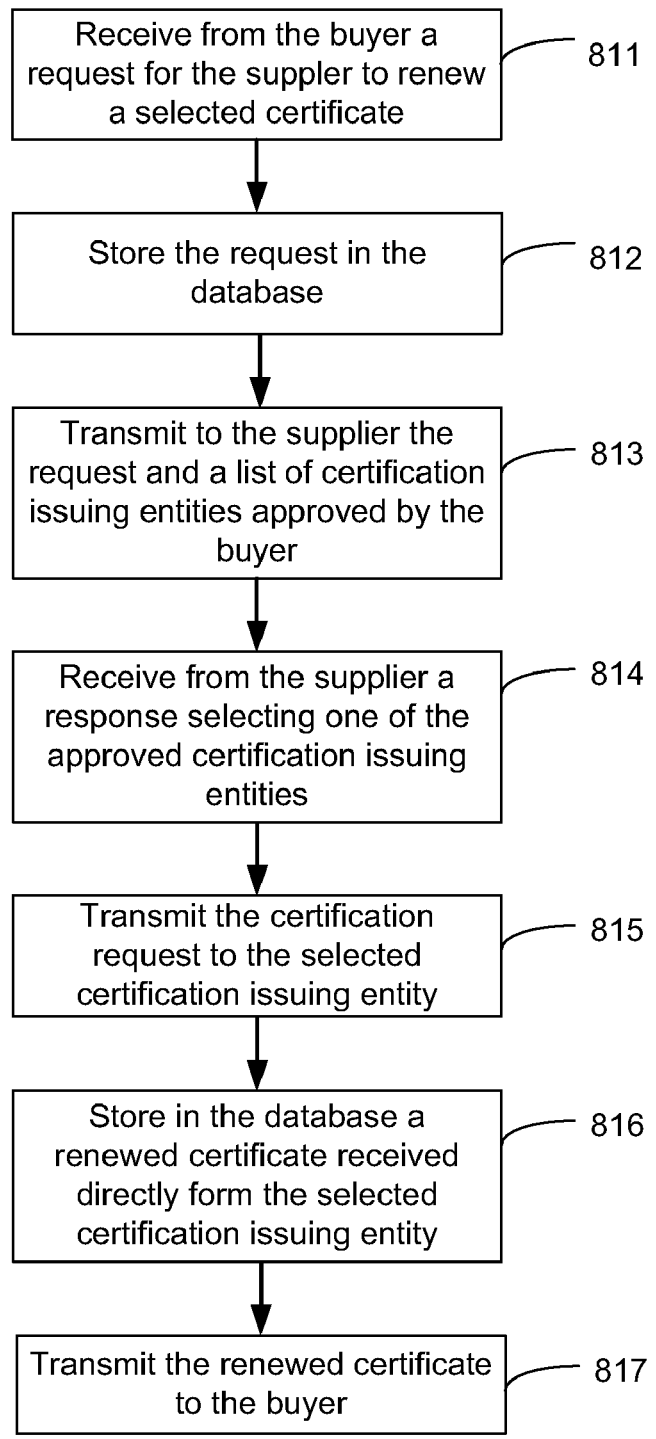
FIG. 8B is an illustrative flow chart depicting exemplary steps performed by the computer system of the present embodiments for implementing updating operations of the type depicted in FIG. 8A.

FIG. 8B illustrates the steps performed by computer system 110 to implement the certification operation described above with respect to FIG. 8A. First, the computer system 110 receives from the buyer a request for the supplier to renew a selected certificate (811). Then, the computer system 110 stores the request in the database (812). The computer system 110 transmits to the supplier the request and a list of certification issuers approved by the buyer (813), and then receives from the supplier a response selecting one of the approved certification issuers (814). The computer system 110 transmits the certification request to the selected certification issuer (815), and stores in database 700 a renewed certificate received directly from the selected certification issuer (816). Thereafter, the computer system 110 transmits the renewed certificate to the buyer and the supplier at the sane (817).

Computer system 110 can also be configured to receive and electronically distribute product recalls throughout a supply chain existing between buyers and suppliers registered with the information exchange network implemented by computer system 110. For such embodiments, database 700 can also store recall information 209 for various types of products, as illustrated in FIG. 7. The recall notice can be for any type of good or product, and can include relevant information such as suspected source of the problem, identification information (e.g., lot numbers, date produced and/or shipped, originating location, and so on). Further, for any given product or class of products, database 700 can store supply chain information 210 detailing the relationship between the various buyers and sellers associated with the supply chain, and computer system 110 can be configured to forward recall notices and recall receipts between the buyers and sellers in a supply chain associated with a product recall.

Figure 9A:
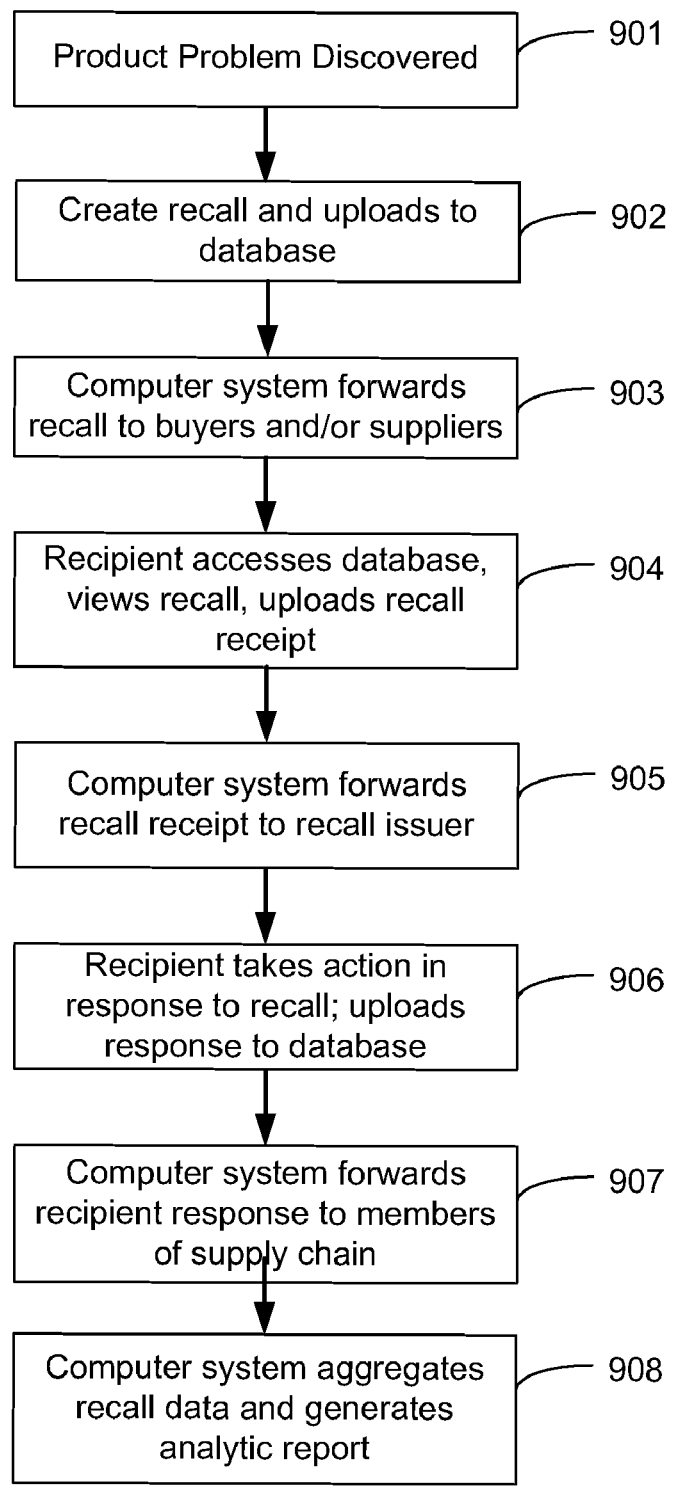
FIG. 9A is an illustrative flow chart depicting an exemplary operation between buyers and suppliers for issuing a recall and forwarding the recall throughout an associated supply chain in accordance with one of the present embodiments.

An exemplary operation of distributing recall information along a supply chain in accordance with some embodiments is described below with respect to the illustrative flow chart of FIG. 9. First, a problem with a product is discovered (901), and a recall notice is created and stored in database 700 (902). The problem can be discovered and uploaded to database 700 by any entity in any suitable manner. For one example, the product problem can be discovered by or reported to a member of the information exchange network implemented by computer system 110, and then the member creates a recall notice and uploads the recall notice to database 700 via an associated computer 130 for storage in recall information 209. For another embodiment, computer system 110 can be configured to monitor industry bulletin boards and/or government sites for posted recall notices (e.g., by analyzing RSS feeds for various recall notices).

In response thereto, computer system 110 forwards the recall notice to appropriate buyers and/or suppliers in the associated supply chain (903). The recall notice can be sent to the appropriate buyers and/or suppliers by computer system 110 via email, text messaging, facsimile, and/or an automated phone message.

For example, if a food packaging company discovers and/or is alerted to contaminated chicken received from a small farm and sold to a buyer having a number of retail outlets, the food packaging company uploads a recall notice to database 700. In response thereto, computer system 110 accesses supplier information 203 and forwards a recall alert to both the buyer and to the small farm.

Upon receipt of the recall alert, each recipient accesses the database 700 from a remote computer 130, views the recall notice, and uploads a recall receipt to the database 700 (904). The recall receipt indicates that the recipient has received the recall notice, and can be stored in recall information 209. For some embodiments, computer system 110 can automatically generate the recall receipt for a recipient when the recipient accesses the recall notice stored in database 700. Then, computer system 110 forwards the recall receipt to the recall issuer (905). In this manner, the member that issued the recall notice is automatically notified by computer system 110 that the intended recipients have received and viewed the recall notice, thereby providing the recall issuer with documentation that its notification obligations associated with the recall have been met.

In response to the recall notice, each recipient takes appropriate action and uploads the action taken to database 700 (906), and then computer system forwards the actions taken by each recipient to members of the supply chain (907). For example, the buyer associated with the contaminated chicken can alert its retail locations of the source and lot numbers of the contaminated chicken, pull all suspected chicken from the retail locations, and then report the action taken to database

700. In response thereto, computer system 110 can report the action taken by the buyer's retail locations to the food processing company and to the small farm that provided the contaminated chicken.

Further, for some embodiments, computer system 110 can be configured to aggregate all reported recall data to generate an analytic report (908). The report can be used by members of the information exchange network to detect patterns of product defects, identify entities repeatedly associated with recalls, and so on.

Figure 9B:
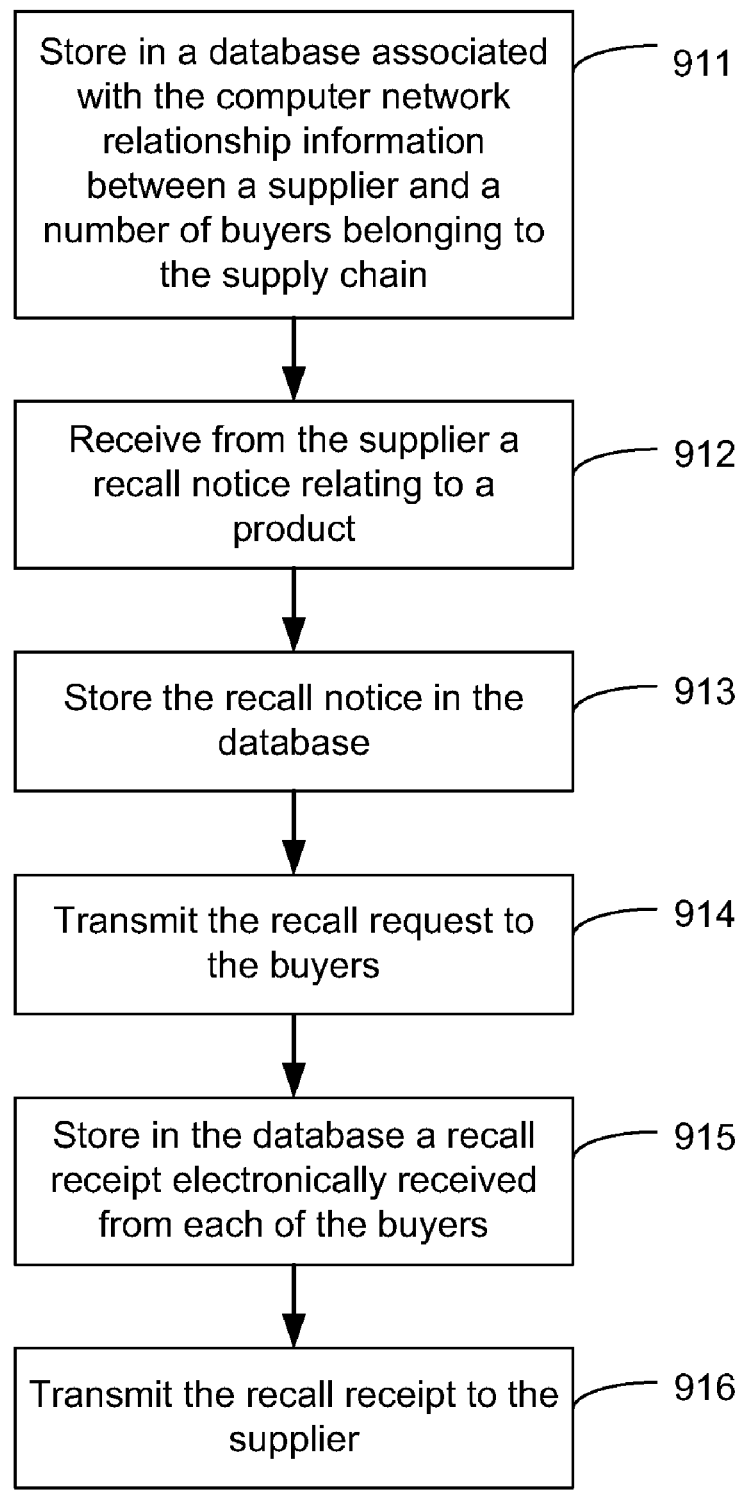
FIG. 9B is an illustrative flow chart depicting exemplary steps performed by the computer system of the present embodiments for implementing the recall notification distribution operations of the type depicted in FIG. 9A.

FIG. 9B illustrates the steps performed by computer system 110 to implement the recall operations described above with respect to FIG. 9A. First, the computer system 110 stores in database 700 relationship information between a supplier and a number of buyers belonging to the supply chain (911). Then, the computer system 110 receives from the supplier a recall notice relating to a product (912), and stores the recall notice in the database 700 (913). Next, the computer system 110 transmits the recall request to the identified buyers (914). The computer system 110 then stores in the database 700 a recall receipt electronically received from the identified buyers (915), and thereafter transmits the recall receipt to the supplier (916).

The ability of computer system 110 to automatically forward recall notices in both directions of a product supply chain and to forward receipt of the recall notices by the intended recipients to the issuer of the recall notice provides numerous advantages over prior art systems that rely upon buyers subscribing to recall bulletin boards and/or recalls announced by the government. First, because database 700 stores information 210 detailing the relationships between the buyers and suppliers associated with numerous product supply chains, upon discovery of a product problem, computer system 110 can instantly alert all members of the associated supply chain of the problem, forward a recall notice to all such members, and forward recall receipts from the recipients to the member responsible for handling the recall, thereby reducing the response time associated with taking appropriate action related to the recall (e.g., as compared to prior systems that rely upon bulletin boards and/or public recall announcements). Reducing the response time for action taken relating to a recall can not only minimize potential harm to consumers of affected products but can also alert members of the affected supply chain of the problem before the media, which allows such members time to be more pro-active in taking corrective action. Second, computer system 110 provides an efficient system for alerting buyers of recall notices, tracking receipt of the recall notices, and documenting actions taken by recipients of the recall notice, thereby significantly reducing the administrative overhead previously required by a supplier to publish a recall notice, alert all the buyers of the recall notice, and document actions taken by the recipient buyers.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a computer system for updating compliance information between a buyer and a supplier stored in a database associated with the computer system, the method comprising:
   receiving from the buyer a request for the supplier to renew a selected certificate;
   storing the request in the database;
   transmitting to the supplier the request and a list of certification issuers approved by the buyer;
   receiving from the supplier a response selecting one of the approved certification issuers;
   transmitting the certification request to the selected certification issuer;
   storing in the database a renewed certificate received directly from the selected certification issuer;
   transmitting the renewed certificate to the buyer; and
   generating a comparative analysis of a plurality of suppliers, which includes the supplier, based on scores identified in renewed certificates that are stored in the database.

2. The method of claim 1, further comprising:
   transmitting the renewed certificate to the supplier at the same time the renewed certificate is transmitted to the buyer.

3. The method of claim 1, further comprising:
   storing the list of approved certification issuers in the database.

4. The method of claim 1, wherein the computer system is operated and controlled by an entity that is independent of the buyer and seller.

5. The method of claim 1, wherein the selected certificate is a food safety inspection.

6. The method of claim 1, wherein the selected certificate is an insurance policy.

7. The method of claim 1, further comprising:
   in response to the computer system determining that one or more particular scores in the scores identified in the renewed certificates is below a predetermined threshold, the computer system sending an alert to the buyer.

* * * * *